Figure 1:
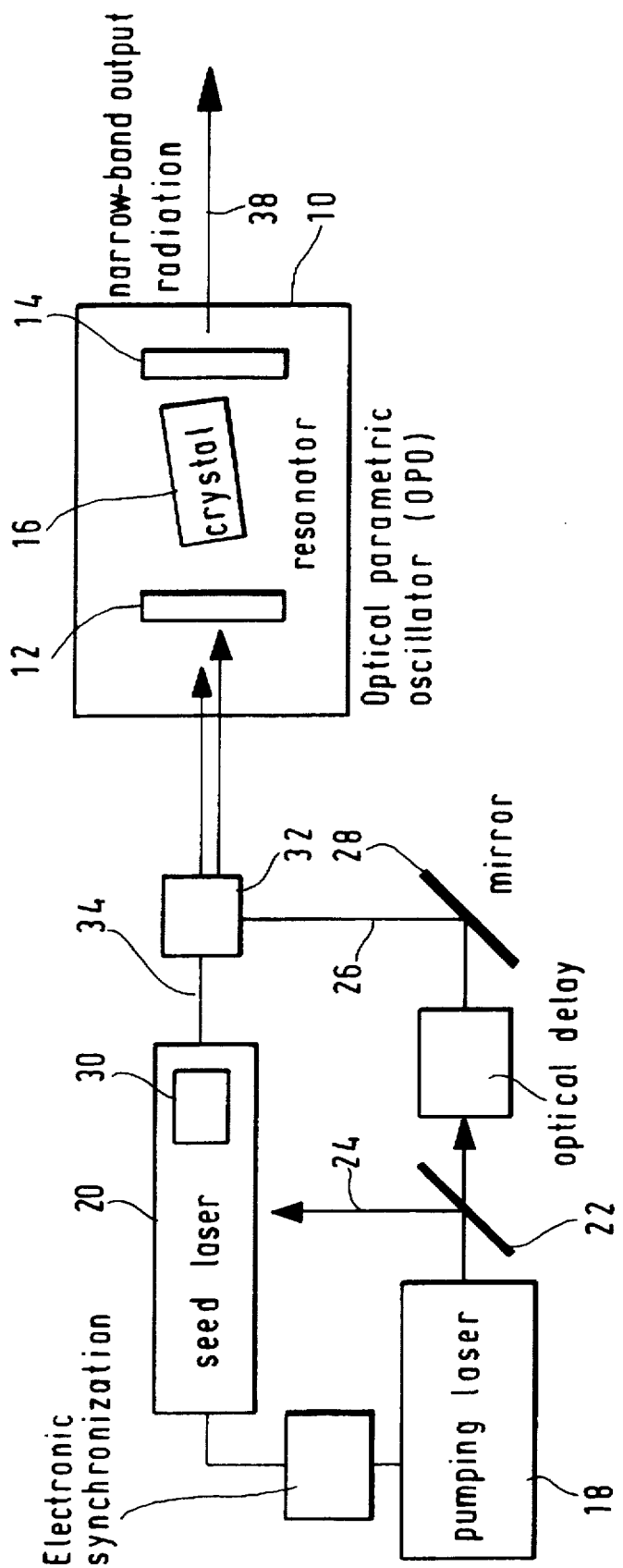

United States Patent [19]

Stamm et al.

[11] Patent Number: 5,796,513
[45] Date of Patent: Aug. 18, 1998

[54] LASER ARRANGEMENT FOR GENERATING NARROW-BAND, TUNABLE COHERENT RADIATION

[75] Inventors: Uwe Stamm, Göttingen; Peter Lokai, Bovenden; Peter Genter; Ingo Klaft, both of Göttingen, all of Germany

[73] Assignee: Lambda Physik Gesellschaft zur Herstellung von Lasern MgH, Germany

[21] Appl. No.: 701,715

[22] Filed: Aug. 22, 1996

[30] Foreign Application Priority Data

Aug. 30, 1995 [DE] Germany ............ 195 31 958.3
Jun. 21, 1996 [DE] Germany ............ 196 24 865.5

[51] Int. Cl.$^6$ ............................................. H01S 3/109
[52] U.S. Cl. ............................................. 359/330; 372/22
[58] Field of Search .................................. 359/326–332; 372/21, 22

[56] References Cited

U.S. PATENT DOCUMENTS

| | | | |
|---|---|---|---|
| 5,015,054 | 5/1991 | Chaffee | 359/326 X |
| 5,047,668 | 9/1991 | Bosenberg | 359/330 |
| 5,053,641 | 10/1991 | Cheng et al. | 359/330 |
| 5,062,112 | 10/1991 | Buchman et al. | 359/327 X |
| 5,577,058 | 11/1996 | Kafka et al. | 359/328 X |
| 5,606,453 | 2/1997 | Walling et al. | 359/330 |

FOREIGN PATENT DOCUMENTS 42 19 169 A1  6/1992  Germany ............ H01S 3/10

OTHER PUBLICATIONS

W.R. Bosenberg & D.R. Guyer, "Broadly tunable, single–frequency optical parametric frequency–conversion system," *J. Opt. Soc. Am. B*, vol. 10, No. 9, Sep. 1993, pp. 1716–1722.
A. Fix, T. Schröder & R. Wallenstein, "Tunable β–barium borate optical parametric oscillator: operating characteristics with and without injection seeding," *J. Opt. Soc. Am. B*, vol. 10, No. 9, Sep. 1993, pp. 1744–1750.
Advertising Brochure, "SCANmate," produced by Lambda Physik, printed Apr. 1994, 15 pages in length.
"Lexikon der Optik", Herausgegeben von Heinz Haferkorn, Dausien 1988, 3 pages in length. [No Month].

*Primary Examiner*—John D. Lee
*Attorney, Agent, or Firm*—Limbach & Limbach, L.L.P.

[57] ABSTRACT

A laser arrangement for generating narrow-band, tunable coherent radiation has an optical parametric oscillator (10) and a tunable seed oscillator (20) whose emitted seed radiation can be set in a narrow-band fashion by means of at least one wavelength-selective element (30). In order to achieve simple tunability of the output radiation (38) of the OPO in conjunction with a narrow bandwidth, good spatial beam quality and high beam intensity without maladjustment of the OPO resonator, the lineshape, set using the wavelength-selective element (30), of the seed radiation $I_{seed}(\lambda)$, and the intensity transmission function $T_{opo}(\lambda)$ of the non-pumped resonator (12, 14) of the OPO (10) are set in such a way that given tuning of the center wavelength $\lambda_{max\,seed}$ of the seed oscillator (20) in the middle between two neighboring transmission maxima of the intensity transmission function $T_{opo}(\lambda)$ it holds for all wavelengths $\lambda$ not equal to $\lambda_{max\,seed}$ that:

$$I_{seed}(\lambda_{max\,seed}) \cdot T_{opo}(\lambda_{max\,seed}) > I_{seed}(\lambda) \cdot T_{opo}(\lambda).$$

9 Claims, 6 Drawing Sheets a.)

| Finesse | resonator length | FSR [Hz] | FSR [1/cm] |
|---------|------------------|----------|------------|
| 5 | 70 [mm] | 2,1E+09 | 0,071429 |

Half-value width of (20) [1/cm]: 0,04
Position of the seed maximum
between the modes in % FSR    0 b.)

c.)

a.)

| Finesse | resonator length | FSR [Hz] | FSR [1/cm] |
|---|---|---|---|
| 5 | 70 [mm] | 2,1E+09 | 0,071429 |

Half-value width of (20) [1/cm]:  0,04
Position of the seed maximum
between the modes in % FSR  50 b.)

c.)

a.)

| Finesse | resonator length | FSR [Hz] | FSR [1/cm] |
|---|---|---|---|
| 5 | 70 [mm] | 2,1E+09 | 0,071429 |

Half-value width of (20) [1/cm]: 0,02
Position of the seed maximum
between the modes in % FSR  50 b.)

c.)

a.)

| Finesse | resonator length | FSR [Hz] | FSR [1/cm] |
|---|---|---|---|
| 5 | 70 [mm] | 2,1E+09 | 0,071429 |

Half-value width of (20) [1/cm]: 0,002
Position of the seed maximum
between the modes in % FSR       50 b.)

c.)

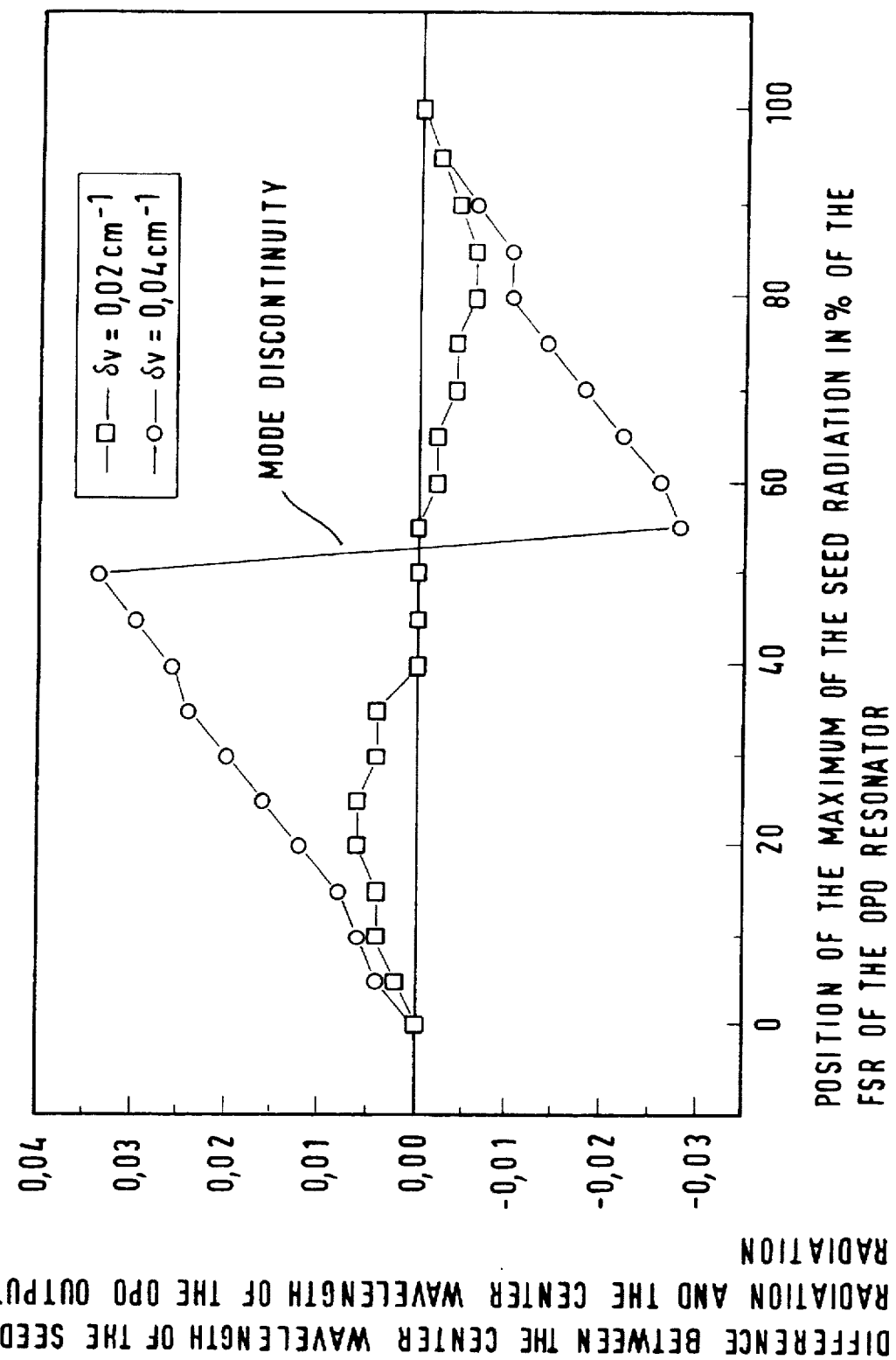

LASER ARRANGEMENT FOR GENERATING NARROW-BAND, TUNABLE COHERENT RADIATION

The invention relates to a laser arrangement for generating narrow-band, tunable coherent radiation having
- an optically nonlinear crystal which is arranged in an optical resonator for the purpose of forming an optical parametric oscillator,
- a tunable seed oscillator which emits seed radiation (injection excitation radiation) whose wavelength can be set in a narrow-band fashion by means of at least one wavelength-selective element, and having
- a device for coupling the seed radiation into the optical parametric oscillator.

DE 42 19 169 A1 describes such a pulsed narrow-band tunable source of coherent radiation. The product brochure from LAMBDA PHYSIK, Göttingen entitled "SCAN-MATE" (1994) also describes such a laser arrangement.

Further of interest as prior art are the articles by W. R. Bosenberg et al., J.Opt.Soc.Am. B 10, 1716 (1993) and A. Fix et al., J.Opt.Soc.Am. B 10, 1744 (1993), as well as U.S. Pat. Nos. 5,053,641 and 5,047,668.

The aforesaid DE 42 19 169 A1 describes a laser arrangement having two optical parametric oscillators (OPO), a first OPO serving as a so-called seed oscillator and a second OPO serving as a so-called power oscillator. A seed oscillator generates so-called seed radiation, that is to say injection excitation radiation, for the power oscillator. In the known laser arrangement, the spectral bandwidth of the radiation emitted by the seed oscillator is reduced by means of a grating and then coupled into the optical parametric power oscillator. What is now the narrow-band seed radiation is amplified in the power oscillator. Since the optical parametric power oscillator, into which the seed radiation is coupled, itself has a mode structure, this mode structure is impressed on the seed radiation, resulting in a worsening of the spectral quality of the output radiation of the power oscillator. In this prior art, the power oscillator is therefore deliberately maladjusted in order to avoid the said mode structure from being impressed on the emitted radiation from the power oscillator. However, such a maladjustment is attended by a worsening of the spatial beam quality of the beam emitted by the optical parametric power oscillator. Further, the energy of the emitted beam is reduced by the maladjustment.

It is conceivable to correct the wavelength of the OPO modes (of the optical parametric power oscillator) in synchronism with the wavelength of the seed radiation in order to avoid the said maladjustment of the resonator. Such a correction (matching) of the wavelengths of the laser modes is known in laser technology, in which the wavelength of the resonator modes is set by changing the resonator length. However, such a setting device very substantially increases the structural complexity of the laser. To date, it has been assumed in the prior art that continuous tuning of the wavelength without maladjustment of the resonator is possible only in this way.

The abovenamed article by W. R. Bosenberg et al., in J.Opt.Soc.Am. B 10, 1716 (1993), describes a laser arrangement for generating tunable, narrow-band coherent radiation, in which the problem of the mode structure of the optical parametric power oscillator is circumvented by providing two optical parametric amplifier stages (OPA) in addition to a narrow-band seed oscillator. A single longitudinal mode of the seed oscillator is amplified in the OPAs. This prior art has, however, the disadvantage that the amplification in an OPA is smaller than in a OPO, with the result that a plurality of amplifiers (OPA) are required there, and this substantially increases the structural complexity.

It is the object of the invention to develop a laser arrangement of the type mentioned at the beginning in a way so as to achieve with simple means a high degree of narrow-bandedness of the output radiation in conjunction with simple tunability of the wavelength, an improved spatial beam quality (homogeneity) and increased output energy.

According to the invention, it is provided for the purpose of achieving this object that the lineshape $I_{seed}(\lambda)$ of the seed radiation which is set using the wavelength-selective element of the seed oscillator, and the intensity transmission function $T_{opo}(\lambda)$ of the non-pumped resonator of the optical parametric oscillator (10) are such that given tuning of the center wavelength $\lambda_{max\ seed}$ of the seed oscillator in the center between two neighboring transmission maxima of the intensity transmission function $T_{opo}(\lambda)$, it holds for all wavelengths $\lambda$, except for $\lambda_{max\ seed}$ that:

$$I_{seed}(\lambda_{max\ seed}) \cdot T_{opo}(\lambda_{max\ seed}) > I_{seed}(\lambda) \cdot T_{opo}(\lambda).$$

According to the invention, the mode structure of the optical parametric oscillator is therefore used in an intentionally positive way in order further to reduce the bandwidth of the seed radiation and at the same time to permit in a simple way continuous tuning of the wavelength without the need to correct the resonator length of the seeded optical parametric oscillator. It is possible by means of the invention to avoid maladjustment of the seeded optical parametric oscillator, as a result of which the spatial beam quality, in particular the homogeneity, of the emitted radiation can be substantially improved and the output energy can be increased.

The lineshape $I_{seed}(\lambda)$ of the seed radiation describes the dependence of the intensity of the seed radiation on its wavelength. The intensity transmission function describes the ratio of the transmitted luminous flux to the incident luminous flux. The intensity transmission function $T_{opo}(\lambda)$ of the non-pumped resonator of the optical parametric oscillator depends on the resonator length, the resonator losses and the specular reflectivities of the resonator. The intensity transmission function $T_{opo}(\lambda)$ can be described approximately by, for example, $$T(\lambda) = \left( 1 + F \cdot \sin^2\left( \frac{2\pi}{\lambda} L \right) \right)^{-1}$$

where F describes the resonator quality and L is the effective resonator length.

The concept of the invention also includes a method for generating narrow-band, tunable coherent radiation, in which the lineshape of the seed radiation is set in accordance with claim 8 such that, given a wavelength which corresponds to the maximum of the seed radiation, the product of the lineshape of the seed radiation and the intensity transmission function is larger than the product of the lineshape of the seed radiation and the intensity transmission function of the non-pumped resonator for all wavelengths.

The invention is based on the general idea that it is possible to avoid the said problems of the prior art and to achieve the abovenamed technical object with simple means when the lineshape of the seed radiation is set to be so slim that, even in the most unfavorable case in which the maximum of the seed radiation is situated precisely in the middle between two maxima of the intensity transmission function of the optical parametric power oscillator, the said functions overlap so little that the bandwidth of the seed radiation in the optical parametric power oscillator is still further reduced.

Thus, according to the invention the half-value width of the seed radiation is set to be so small with reference to the spacing between two neighboring transmission maxima of the intensity transmission function of the non-pumped resonator of the optical parametric oscillator that the seed radiation in the OPO is at least not broadened, and is preferably even reduced.

Preferred refinements of the invention are described in the dependent claims.

The invention is explained in more detail below with the aid of the drawing, in which:

FIG. 1 shows a diagram of a laser arrangement by means of which the invention can be implemented;

FIGS. 2a to 2c and FIGS. 3a to 3c respectively show characteristics of the lineshape of the seed radiation and the intensity transmission function, the conditions according to the invention not yet being fulfilled;

FIGS. 4a to 4c and FIGS. 5a and 5c show characteristics of the line-shape of the seed radiation and of the intensity transmission function, the conditions according to the invention being fulfilled; and FIG. 6 shows the dependence of the center wavelength of the output radiation of the seeded OPO as a function of the center wavelength of the seed radiation, once for nonfulfillment of the inventive condition (dotted line), and once for fulfillment of the inventive condition (line composed of squares).

The laser arrangement in accordance with FIG. 1 has an optical parametric oscillator 10 which is known per se to the person skilled in the art. The optical parametric oscillator 10 is formed by an optical resonator composed of mirrors 12, 14 between which an optically nonlinear crystal 16 is arranged in a known way. The coherent output radiation 38 of the optical parametric oscillator 10 is to be in a narrow band, have a good spatial beam quality (homogeneity) and to have a high output energy.

A pumping laser 18 pumps both a seed oscillator 20 and the optical parametric oscillator 10. The pumping lasers concerned are known to the person skilled in the art (compare the prior art cited above), for example the harmonics of an Nd:YAG laser can be used. It is also possible to use XeCl excimer lasers as pumping source.

The radiation emitted by the pumping laser 18 is split by means of a beam splitter 22 into two component pumping pulses 24 and 26. The first component pumping pulse 24 pumps the seed oscillator 20, and after traversing an optical delay path and being deflected at a mirror 28 the second component pumping pulse 26 is coupled in a known way into the crystal 16 of the OPO 10, specifically such that it impinges on the crystal in a synchronized fashion correctly timed relatively to the seed radiation 34.

A narrow-band dye laser, which is known per se in the prior art, particularly comes into consideration as the seed oscillator 20.

Alternatively, it is also possible for a narrow-band optical parametric oscillator, or else a narrow-band semiconductor laser to be used as the seed oscillator 20. If the seed oscillator 20 is not pumped by the pumping laser 18, the beam splitter 22 and the component beam 24 can be eliminated. The temporal synchronization between the component pumping pulse 26 and the seed radiation 34 is performed electronically in the case of pulsed seed radiation.

The seed oscillator emits narrow-band, tunable seed radiation whose wavelength can be set by means of at least one wavelength-selective element 30. A grating and/or etalon, in particular, come into consideration as the wavelength-selective element 30 for the seed oscillator 20.

At least one of the wavelength-selective elements which narrow the bandwidth of the seed radiation 34 can be arranged in the resonator of the seed oscillator. Typical bandwidths of the narrow-band seed radiation generated are specified in the figures.

The wavelength-selective element can also be arranged outside the seed oscillator. The narrow-bandedness of the seed oscillator or of a corresponding radiation source can thus also be generated ("extra cavity") outside the oscillator or the source.

The seed radiation 34 is coupled into the Optical Parametric Oscillator 10 in a fashion synchronized with the component pumping pulse 26 by means of an optical device 32 known per se. OPO 10 emits the tunable, narrow-band output radiation 38.

Figure 2:
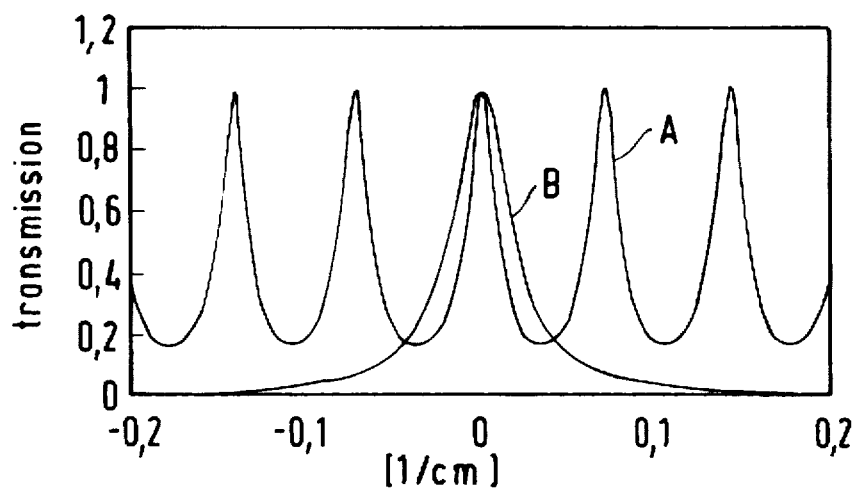
Figure 2:
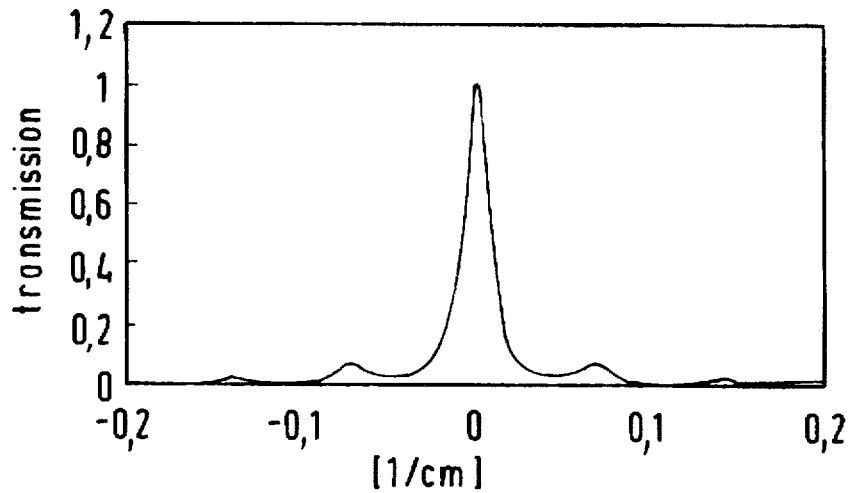

FIG. 2 serves to explain the fundamentals of the invention. The optical parameters are reproduced in FIG. 2a. In the conventional terminology, FSR is the so-called free spectral range of the OPO.

In curve A, FIG. 2b shows the characteristic of the intensity transmission function, that is to say the modes of the OPO 10. Curve B is the lineshape of the seed radiation 34 (before coupling into the OPO 10). Both functions are normalized to "1", in FIG. 2b.

In accordance with FIG. 2b, in this example the center wavelength (the maximum) of the seed radiation (34; curve B) is set precisely to a maximum of the intensity transmission function, that is to say to a resonator mode of the OPO 10. This resonator is excited as a result. If the spectral width (half-value width) of the seed radiation is smaller than the mode spacing of the OPO resonator (as in FIG. 2b), essentially only one of the OPO resonator modes builds up, as is shown in FIG. 2c. This means that the bandwidth of the OPO output radiation (FIG. 1, 38) is smaller than or equal to the bandwidth of the seed radiation 34. Thus, there are still no problems arising with regard to bandwidth reduction in the case of coincidence of the maxima of the lineshape of the seed radiation and the incipient resonator mode of the OPO 10, as is presupposed in FIG. 2b.

Broadening of the spectrum of the output radiation of the OPO 10 by comparison with the seed radiation 34 occurs, however, whenever the center wavelength (the maximum) of the seed radiation 34 and the center wavelength (maximum) of an OPO resonator mode do not coincide. The critical point is reached when the center wavelength of the seed radiation is situated exactly between the center wavelengths of two neighboring OPO resonator modes. This is shown in FIG. 3b, where the curve B once more reproduces the lineshape of the seed radiation 34 and the curve A reproduces the intensity transmission function $T_{opo}(\lambda)$ of the non-pumped OPO 10. The maxima of curve A are thus the resonator modes of the OPO 10. FIG. 3a shows the optical parameters of this laser arrangement.

In accordance with FIG. 3c, in the case of the relative position of the maxima of the lineshape and of the intensity transmission function in accordance with FIG. 3b at least two maxima are formed in the OPO resonator 10, whose spacing corresponds approximately to the OPO resonator mode spacing. According to FIG. 3c, the entire spectral width of the OPO output radiation is conspicuously greater than that of the seed radiation (curve B in FIG. 3b). According to FIG. 3c, the OPO output radiation 38 has a width of 0.09 cm$^{-1}$, whereas the half-value width of the seed radiation 34 (curve B) is only 0.04 cm$^{-1}$. The seeded OPO 10 thus oscillates essentially in two neighboring resonator modes, and the output radiation 38 has a correspondingly wide spectrum.

Figure 3:
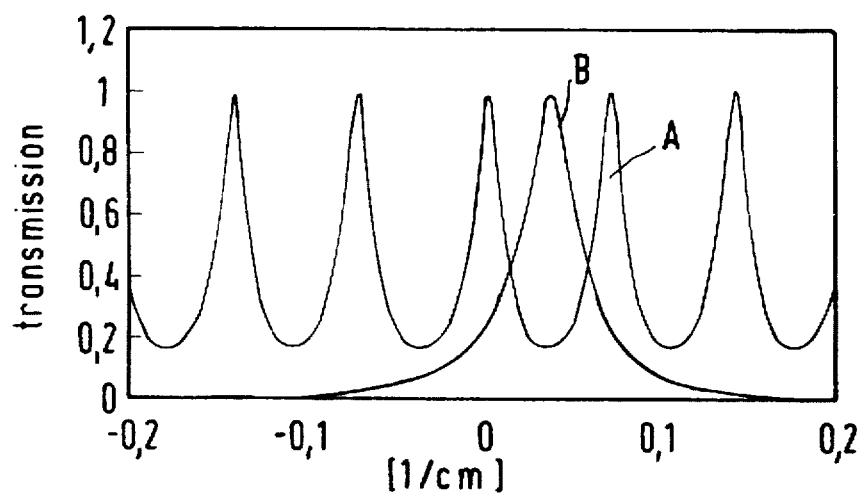
Figure 3:
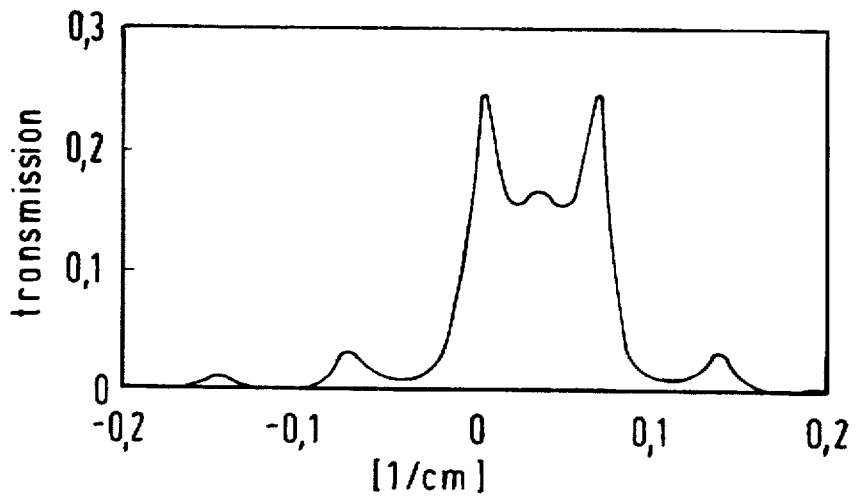
Figure 4:
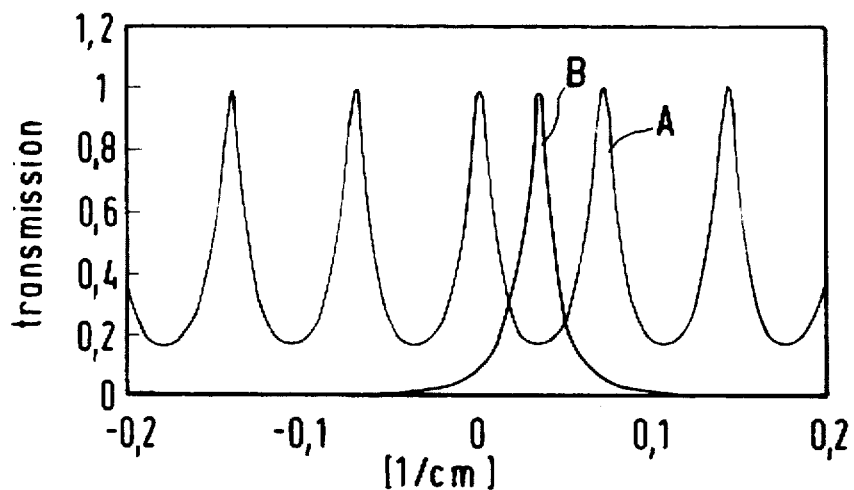
Figure 4:
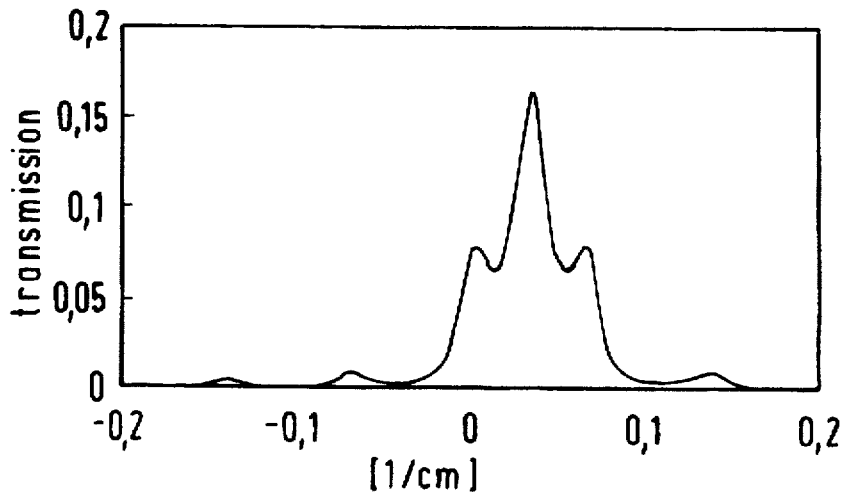
Figure 5:
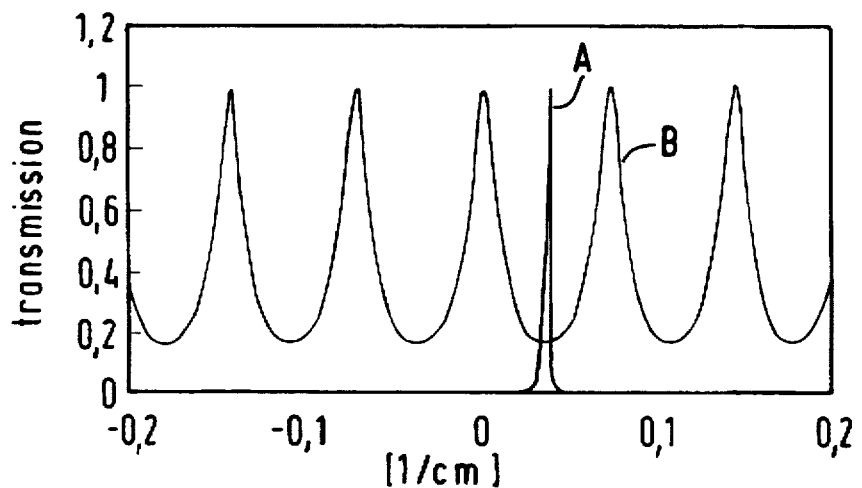
Figure 5:
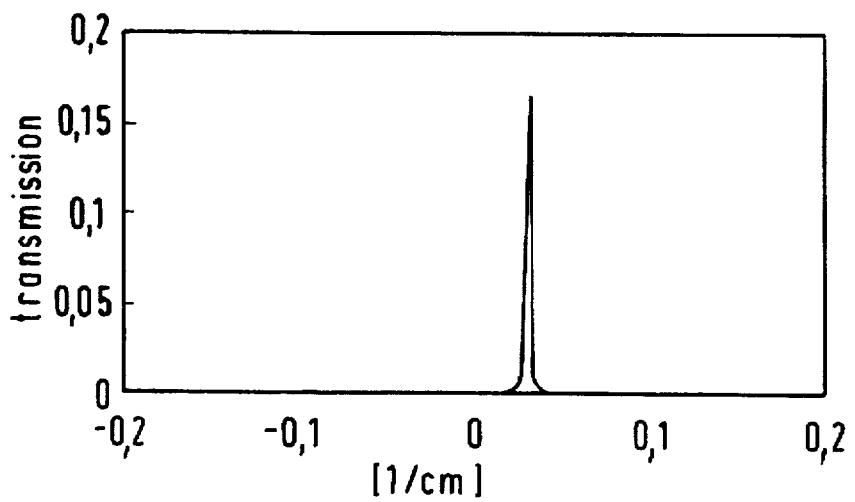

FIGS. 4 and 5 show the laser arrangements in which the inventive condition $$I_{seed}(\lambda_{max\ seed}) \cdot T_{opo}(\lambda_{max\ seed}) > I_{seed}(\lambda) \cdot T_{opo}(\lambda)$$

is fulfilled for all $\lambda$ except $\lambda = \lambda_{max\ seed}$. FIG. 4a reproduces the optical parameters of the laser arrangement which are of interest. FIG. 4b shows the lineshape of the seed radiation in curve B, and the characteristic of the intensity transmission function $T_{opo}(\lambda)$ of the OPO 10 in curve A. As a comparison of FIGS. 4 and 3 shows, in accordance with FIG. 4b the lineshape B of the seed radiation is substantially narrower here, with the result that a substantially smaller overlap with the intensity transmission function $T_{opo}(\lambda)$ occurs. Again, FIG. 4b shows the most critical (least favorable) case, in which the center wavelength of the lineshape B of the seed radiation is situated exactly in the middle between the center wavelengths of two neighboring OPO resonator modes (curve A). Despite this, the OPO output radiation 38 shown in FIG. 4c exhibits only a single pronounced maximum. The bandwidth of the OPO output radiation 38 is approximately equal to the bandwidth of the seed radiation 34.

FIGS. 4b and 4c show an example in which the above inventive condition is just fulfilled. The spectral distribution of the OPO output radiation 38 becomes narrower and smoother the better the condition is fulfilled. This is shown in FIG. 5. In FIGS. 5a, b and c, the specified parameters and curves correspond to those of FIGS. 2 to 4, and so a repetition of the description is that extent unnecessary. FIG. 5c shows the extremely narrow-band output radiation 38, which is achieved when the above condition is strictly fulfilled, that is to say the product of the maximum of the line-shape of the seed radiation and the intensity transmission function for the same wavelength is substantially larger than the product of these functions for any arbitrary other wavelength.

FIG. 6 shows results for an OPO 10 with a free spectral range FSR of 0.07 cm$^{-1}$, on the one hand for seed radiation 34 (FIGS. 2 to 5, curve B) with a bandwidth of 0.02 cm$^{-1}$ (condition fulfilled), and on the other hand with a bandwidth of 0.04 cm$^{-1}$ (condition not fulfilled). The abscissa shows the position of the maximum of the seed radiation (curve B) with reference to two neighboring maxima of the intensity transmission function (curve A), specifically as a function of the free spectral range of the OPO 10 (that is to say the mode spacing). In other words: when on the abscissa in FIG. 6 the values run from 0 to 100%, this means that, for example, in FIG. 4b the curve B is displaced in steps from one maximum of the curve A to the next maximum of the curve A.

The ordinate in FIG. 6 reproduces a difference between the center wavelength of the seed radiation and the center wavelength of the OPO output radiation. As FIG. 6 shows, in the example with 0.02 cm$^{-1}$ half-value width of the seed radiation the wavelength of the output radiation 38 (FIG. 1) of the OPO 10 corresponds quite accurately to the wavelength of the seed radiation. In an example with a half-value width of 0.04 cm$^{-1}$ of the seed radiation 34, by contrast, extreme mode discontinuity occurs when the center wavelength of the seed radiation (curve B in FIG. 3b) passes through the center between the two maxima of the intensity transmission function (curve A). In this example, the wavelength of the output radiation 38 can no longer be continuously tuned.

We claim:

1. A laser arrangement for generating narrow-band, tunable and coherent radiation, having

- at least one optically nonlinear crystal (16) which is arranged in an optical resonator (12, 14) for the purpose of forming an optical parametric oscillator (10),
- a tunable seed oscillator (20) which emits seed radiation (34) whose wavelength can be set in a narrow-band fashion by means of at least one wavelength-selective element (30), and having
- a device (32) for coupling the seed radiation into the optical parametric oscillator (10), wherein the lineshape $I_{seed}(\lambda)$ of the seed radiation which is set using the wavelength-selective element (30), and the intensity transmission function $T_{opo}(\lambda)$ of the non-pumped resonator (12, 14) of the optical parametric oscillator (10) are such that, given tuning of the center wavelength $\lambda_{max\ seed}$ of the seed oscillator in the center between two neighboring transmission maxima of the intensity transmission function $T_{opo}(\lambda)$, it holds for all wavelengths $\lambda$ not equal to $\lambda_{max\ seed}$ that:

$$I_{seed}(\lambda_{max\ seed}) \cdot T_{opo}(\lambda_{max\ seed}) > I_{seed}(\lambda) \cdot T_{opo}(\lambda).$$

2. The laser arrangement as claimed in claim 1, wherein the seed oscillator (20) is a narrow-band dye laser.

3. The laser arrangement as claimed in claim 1, wherein the seed oscillator (20) is an optical parametric oscillator, in particular a narrow-band optical parametric oscillator.

4. The laser arrangement as claimed in claim 1, wherein the seed oscillator (20) is a narrow-band semiconductor diode laser.

5. The laser arrangement as claimed in claim 1, wherein a grating is provided as the wavelength-selective element (30) of the seed oscillator.

6. The laser arrangement as claimed in claim 1, wherein an etalon is provided as the wavelength-selective element (30) of the seed oscillator (20).

7. The laser arrangement as claimed in claim 1, wherein the at least one wavelength-selective element (30) of the seed oscillator (20) permits only the build up of a single longitudinal mode of the seed oscillator, and the resonator length of the seed oscillator is corrected by means of a device in such a way that the wavelength of the single longitudinal mode can be continuously tuned.

8. A method of generating narrow-band, tunable coherent radiation output from an optical parametric oscillator, said optical parametric oscillator including at least one optically non-linear crystal located within an optical resonator, said method comprising the steps of:

injection seeding the optical parametric oscillator with a narrow-band tunable radiation from a seed oscillator; and controlling the line shape $I_{seed}(\lambda)$ of the seed radiation and the intensity transmission function $T_{opo}(\lambda)$ of the non-pumped resonator of the optical parametric oscillator such that when the center wavelength $\lambda_{max\ seed}$ of the seed oscillator is tuned in the center between two neighboring transmission maxima of the intensity transmission function $T_{opo}(\lambda)$, it holds for all wavelengths $\lambda$ not equal to $\lambda_{max\ seed}$ that:

$$I_{seed}(\lambda_{max\ seed}) \cdot T_{opo}(\lambda_{max\ seed}) > I_{seed}(\lambda) \cdot T_{opo}(\lambda).$$

9. A method as recited in claim 8, further including the step of setting the wavelength of the seed oscillator in such a way that only a single longitudinal mode of the seed oscillator builds up, and the resonator length of the seed oscillator is corrected in such a way that the wavelength of the single longitudinal mode can be continuously tuned.

* * * * *